May 26, 1942. A. FRIDOLPH 2,284,274
FASTENING ELEMENTS AND METHOD OF UTILIZING THE SAME
Filed May 10, 1939 2 Sheets-Sheet 1
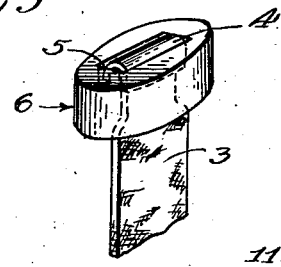
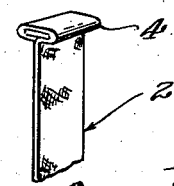
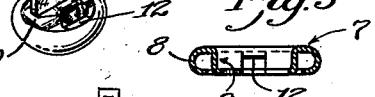
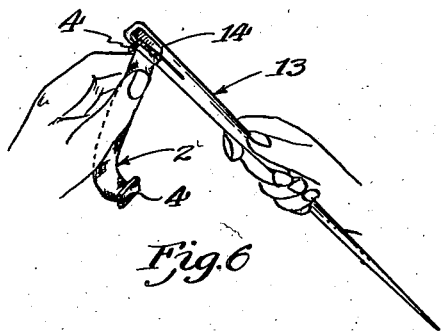
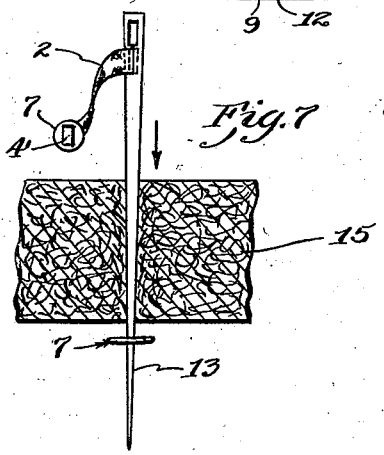
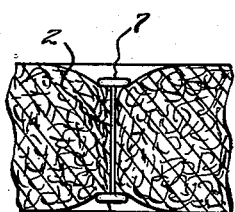
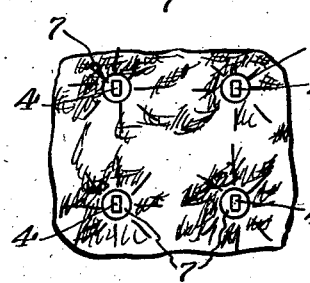
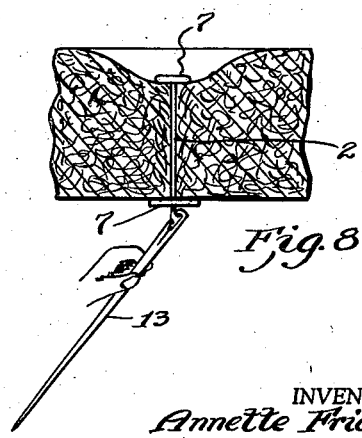
INVENTOR.
Annette Fridolph
BY Barnes, Kisselle, Laughlin & Raisch
ATTORNEYS May 26, 1942.  A. FRIDOLPH  2,284,274
FASTENING ELEMENTS AND METHOD OF UTILIZING THE SAME
Filed May 10, 1939  2 Sheets-Sheet 2
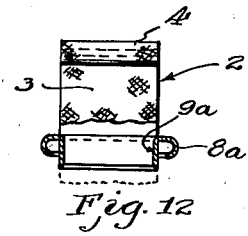
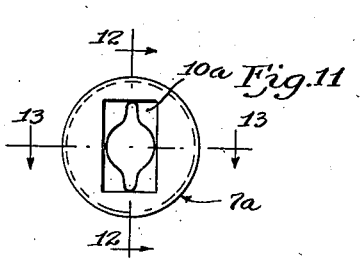
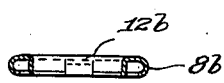
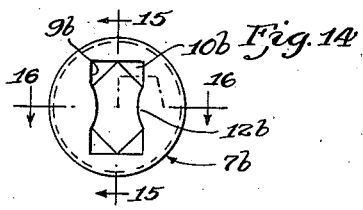
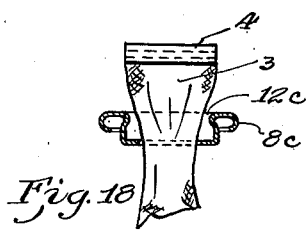
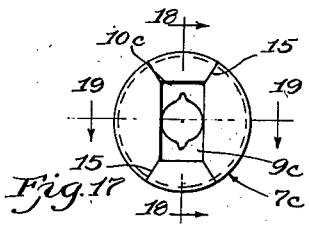
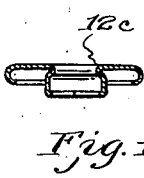
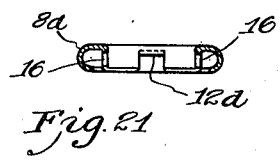
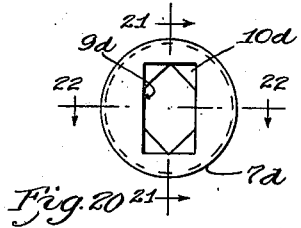
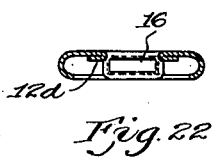
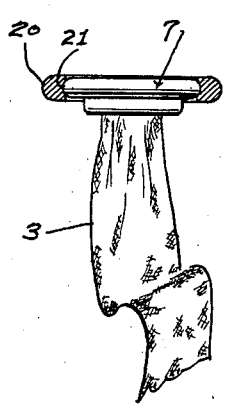
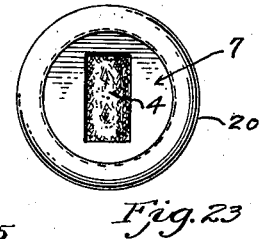
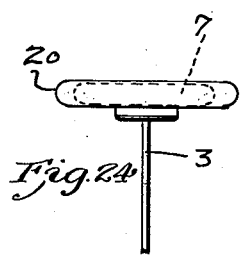
INVENTOR.
Annette Fridolph
BY
Barnes, Kisselle, Laughlin & Raisch
ATTORNEYS

UNITED STATES PATENT OFFICE 2,284,274

FASTENING ELEMENT AND METHOD OF UTILIZING SAME

Annette Fridolph, New York, N. Y., assignor to A. B. A. Specialties Company, Inc., New York, N. Y., a corporation of New York Application May 10, 1939, Serial No. 272,749

16 Claims. (Cl. 24—102)

This invention relates to fastening elements and method of utilizing same in the tufting of mattresses, upholstery and the like.

This application is a continuation in part of my application Serial No. 107,122, filed October 23, 1936, now Patent No. 2,192,161, granted February 27, 1940.

The main tufting element around which the present invention is built comprises an elongated flexible body having a substantially stiff tufting head at each end thereof, said tufting head preferably comprising a portion of the flexible body permanently folded relative to a stiff bendable member, such as soft metal channel; in its preferred form, the tufting head is elongated or rectangular in shape, normally positioned transversely of the flexible body and being insertable in a tufting needle or the like to be passed through the article being tufted. Such article and the single movement step of tufting, have proven highly beneficial in that the tufting operation has been accomplished quickly, cheaply and expeditiously, and the articles used have been fastened in proper position to give the proper tufting effect and appearance. However, some objection has been made to the fact that the exposed tufting heads have a general rectangular shape instead of being round. Ornamental round buttons have been provided for use with tufting heads of the type above described, but their use has added a material expense, both as to the initial cost of the article and the method of assembly.

It is an object of the present invention to provide an ornamental fastening or tufting head which becomes an actual part of the tufting head of the basic tufting element. In its preferred form the base tufting head is wholly or partially exposed and is positioned in the same general plane as the ornamental fastening or tufting head. The construction is such that the base tufting head may be very small, the ornamental button surrounding the tufting head providing sufficient area for contacting a relatively large surface of the articles being tufted. Furthermore, the base tufting head and the ornamental button therefor, being in the same general plane, will provide a general tufting head of very shallow construction, such structure being particularly important in connection with mattresses, upholstery and the like.

A further feature of the present invention has to do with the provision of an ornamental head for a base tufting or fastening head of such construction that the needle carrying the base fastening head will pass through the ornamental button, thus making for a very rapid and inexpensive assembly of the ornamental head to the base head.

A still further feature of the invention has to do with an ornamental head for tufting or fastening heads, of such construction that relative movement between the ornamental and base heads will result in frictional, relatively permanent assembly, whereby to prevent the ornamental head from moving up and down the body carrying the base tufting or fastening head.

Other features of the invention have to do with the detailed and structural features of the ornamental head as will be more clearly set forth in the specification and claims.

In the drawings:

Fig. 1 is a perspective view of one form of combined fastening or tufting and ornamental heads to form a compact general tufting head for tufting elements and the like.

Fig. 2 is a perspective view of a base tufting element and showing a modified form of ornamental head secured to one end thereof.

Fig. 3 is a top plan view of a preferred ornamental tufting or fastening head, showing particularly the round outer shape and the recess for receiving a base tufting or fastening head of general rectangular shape.

Figs. 4 and 5 are sectional views taken on line 4—4 and 5—5 of Fig. 3.

Figs. 6, 7, 8 and 9 are diagrammatic views illustrating the practice of my method and the use of tufting articles and ornamental buttons substantially as shown in Figs. 2 and 3.

Fig. 10 is a plan view of the structure shown in Fig. 9, illustrating the appearance of the combined substantially rectangular and round tufting heads.

Fig. 11 is a plan view of a modified form of ornamental button head, so proportioned in relation to the base tufting head used that when assembled the two heads will be in general effect permanently secured together.

Figs. 12 and 13 are sectional views taken on lines 12—12 and 13—13 of Fig. 11.

Fig. 14 is a plan view of a further modified form of ornamental button head wherein the side walls of the rectangular depression are embossed so as to effectively hold a base tufting head element in place after initial assembly.

Figs. 15 and 16 are sectional views taken on line 15—15 and 16—16 of Fig. 14.

Fig. 17 is a plan view of a further modified form of ornamental button and showing slots positioned adjacent the corners of the rectangular head receiving portion, whereby to give the head a general resilient clamping action relative to the base fastening or tufting head.

Figs. 18 and 19 are sectional views taken on lines 18—18 and 19—19 of Fig. 17.

Fig. 20 is a plan view of a further modified form of ornamental button.

Figs. 21 and 22 are sectional views taken on lines 21—21, and 22—22 of Fig. 20, and showing particularly the cutting out of the ends of the center depression whereby to receive the ends of the base tufting head to hold same in place within the ornamental button.

Figs. 23, 24 and 25 are plan, elevation and sectional views of a combined tufting and ornamental head similar to the unit shown in Fig. 18, but with an added annular ornamental member snapped to the edge thereof so as to form an enlargement.

The main tufting element which forms the base of the present invention is of the same type as that disclosed in my above mentioned copending application No. 107,122, now Patent No. 2,192,161 granted Feb. 27, 1940, and consists of a tufting element generally designated 2 which preferably comprises a connecting body 3 preferably in the form of tape and similar heads 4 at each end thereof. The heads 4 are of elongated or general rectangular shape and may be formed by folding a continuation of the tape 3 with reference to a stiffened metallic member as specifically described in my application No. 107,122, now Patent No. 2,192,161 granted Feb. 27, 1940. The exact form of the tufting or fastening heads 4 is immaterial in the present invention except that they be elongated or generally rectangular in shape so as to permit their being threaded into a tufting needle or into an ornamental button, as will be later described.

One form of ornamental fastening or tufting head is shown in Fig. 1 wherein the stiffened head 4 fits in a suitable recess or opening 5 formed in an ornamental button element or member 6, the tape 3 passing entirely therethrough in a restricted opening or slot whereby the head 4 engages the shoulders formed by the restricted opening or slot entering into the recess 5. It will be seen that the ornamental button or collar 6 is in the same general plane as the tufting head 4 thus making an ornamental head very little thicker than the depth of the tufting head 4. The tufting head 4 may be easily removed and turned so that the axis thereof is in the general axis of the tape 3, so as to provide ready detachability of the head 4 and thus the entire tufting or fastening element from the ornamental button 6.

For certain types of tufting it is desirable to use a one piece tuft, of the type disclosed in my parent Patent No. 2,098,140, with a tufting head, such as shown at 4 in Fig. 1, of around $\frac{7}{16}$ to $\frac{1}{2}$" long, $\frac{1}{16}$" wide and $\frac{3}{32}$" in depth. I have provided a round circumferential fastening or tufting head within approximately the same overall limits as said standard tufting head, by shortening the tufting head 4 to about $\frac{1}{4}$" and designing a rigid ornamental head or button around the shortened tufting head.

Referring specifically to Figs. 3, 4 and 5, I have shown a round stamped sheet metal member 7, which for illustration may be approximately $\frac{1}{2}$" in diameter. The outer edge 8 of the member is curled to a depth of approximately $\frac{3}{32}$". The center of the sheet metal disc is embossed to form a depression generally designated 9, which depression is of such size as to snugly receive the head 4.

Not only is the depression 9 of approximately the same depth as the curled edge 8 (in the example taken $\frac{3}{32}$"), but a portion of the bottom wall or shoulder 10 of the depression is cut away in a novel manner to form an opening peculiarly shaped for the quick and easy assembly of the standard fastening head 4 to the ornamental button or head 7. Specifically, the cut away portion of bottom 10 is preferably such as to leave triangular shaped supporting shoulders at the corners and slots 11 at the ends to receive edges of the tape 3 whereby to keep the same from raveling.

To give even more room for easy assembly of the head 4 than provided by the cut away portion of the bottom 10, side portions 12 are cut away and turned back. The cut away side portions make it possible for one assembling the ornamental buttons to the fastening heads 4 by hand, to grasp the buttons 7 at will and pass the head 4 endwise through the opening in the depression from practically any angle; whereas, without the cut away side portions 12 it would be necessary to first adjust the head 4 or the bottom to a predetermined position for assembly; furthermore the cut away portions provide more spread in the automatic assembly of the parts by passing a tufting needle through the opening in the button, as will be presently explained. It will be understood that the ornamental button or head, as well as the tufting element head 4, and the connecting tape 3, will vary in size and shape in accordance with varying demands and uses; and in most cases the diameter of the member 7 will be approximately equal to the length of the standard tufting head (of the type shown at 4) which it replaces. The button 7 is built around the standard tufting head as distinguished from being merely connected or attached to it, and obviously may be molded or stamped from different kinds of materials.

The general method of tufting as described in my Patent No. 2,098,140 may be followed, and the tufting element 2 may be threaded into the tufting needle, before or after the needle is passed through the article being tufted; the novel step added by the present improvement is the passing of the needle directly through the body of the ornamental button to automatically assemble and locate the standard tufting head 4 in the depressions 9. In carrying out this method, a standard tufting needle 13 of the type having a recess 14 for the head 4, may be used. A button 7 may be assembled to one end of the tufting element 2, before or after assembly of the other head 4 in the recess 13, and the needle passed through the mattress or other article 15. A button 7 may be threaded on to the needle, as shown at the bottom of Fig. 7, the needle passed entirely through the button, and the mattress compressed (see Fig. 8). The head 4 may then be released to automatically be centered in the depression in the button, and the compressed parts will assume the general shape shown in Figs. 9 and 10.

The tape forming the body of the tufting element and a portion of the heads 4, may be of a color to match the article being tufted, and the surrounding button 7 blended as to color. Thus all the structural and assembly benefits and appearance of a unitary tufting element 2 are obtained, as well as the appearance of a round button or fastening head, and without any sacrifice to space or assembly time. It will be obvious that the button 7 may be assembled on the needle prior to passing same through the mattress, similar to the disclosure in Figs. 25 to 27 in Patent No. 2,098,140.

Figs. 11 to 22 illustrate various modifications of the ornamental button shown in Figs. 3 to 5, the principal feature of these modifications relating to means for obtaining varying degrees of fit between the standard head 4 and surrounding ornamental button, whereby to maintain the assembly whenever tension is removed from the head.

In the form shown in Figs. 11, 12 and 13, the bottom 10a of depressions is similar to that shown in Figs. 3 to 5 except that the side portions are not cut away. In this modification the end walls of the depression 9a are slightly shorter than tape forming the covering for the head 4 of the tufting element. The reinforcing element or clip within the head 4 is preferably about the same length as the depression 9, with the result that when the head 4 is drawn into the depression 9a the material at the end of the head will be crowded into the depression—holding the button quite securely in place.

The ornamental button shown in Figs. 14, 15 and 16 differs from the unit shown in Figs. 3 to 5 in that the side walls of the depression 9b are embossed inwardly as at 12b in addition to being cut away. In forcing the head 4 past the opposed embossed side walls it will be securely held in place.

The essential modifications in the form shown in Figs. 17, 18 and 19 reside in the forming of slots 15 which extend from the corners of the depression 9c outwardly, and the beading over of top portions of the side walls as at 12c. A snap fastener effect is obtained here as the head 4 is moved into center position within the button.

In the form shown in Figs. 20, 21 and 22 the general design of the button shown in Figs. 3 to 5 is retained and the end walls of the depression 9d are cut away as at 16. Surplus material at the ends of the head will be forced into these openings 16 upon assembly—tending to hold the tufting head in the center assembled position.

In the modifications shown in Figs. 23 to 25 I utilize a combined tufting unit and ornamental button member 7 of the type shown in Fig. 5 or Fig. 18, and which ornamental button may be formed of stamped sheet metal, plastic or the like. To make the ornamental member 7 enlargeable at will or to change the general outer contour thereof, I provide a snap 20 which is preferably formed of plastic material and the inner annular edge 21 of which is so recessed and of such diameter as to readily snap over the curved edge of the member 7. This structure makes it possible to considerably enlarge the ornamental member 7 and, if desired, the outer periphery of the member 20 can be given various ornamental shapes; for instance, if desired, it can be given a rectangular shape similar to the tufting or fastening head 4.

It will thus be seen that I have provided a complete tufting or fastening element comprising a base tufting or fastening element having an elongated body and an enlarged relatively stiff head or heads which may be used if desired in accordance with the one operation method disclosed in my Patent No. 2,098,140, and an ornamental round tufting or fastening head built around the base head. The shoulders forming part of the ornamental head provide sufficient supporting surface to permit the base head to be slightly reduced in size. The simplified and inexpensive method of tufting and fastening the base element 2 is retained. Where a round ornamental appearance is desired, my ornamental button may be added without increasing the thickness or overall dimensions of the fastening head. At least one ornamental button may be automatically added as an inherent part of the one step assembly operation, and where another button is desired it may be added in a simple inexpensive movement in the normal operation of the threading of the general element to the needle.

It will be understood that by the use of a fabric tufting head 4, which is rectangular in shape and the round ornamental enclosing button, that natural objects such as a cat's eye may be easily simulated, the head member 4 of the tufting or fastening unit serving as the pupil of the eye. In upholstery, the fabric forming the body portion 3 and the covering for the head members 4 can be the same shade or matching shade with the upholstery of the pad, chair or automobile seat, and the ornamental enclosing button 7 can be of a different matching shade so as to give a two tone effect.

What I claim is:

1. The method of tufting mattresses, upholstery and the like, which includes employing tufting elements severally comprising two tufting heads united by a connecting bond and an apertured ornamental head surrounding one of said tufting heads, passing a tufting needle with one of said two heads connected thereto through the article to be tufted and through the aperture in said ornamental head so as to cause the other of said tufting heads to engage one face of the article being tufted, and releasing the tufting head connected to said needle when it has passed through said ornamental head and beyond the face of the article being tufted, so that said ornamental head will be automatically positioned around one of said tufting heads and engage one face of the article being tufted upon the expansion thereof.

2. The method of tufting mattresses, upholstery and the like, which includes employing preformed unitary tufting elements severally comprising two heads united by a connecting bond, securing an auxiliary head member such as a button or the like to one of said heads, moving a portion of a tufting needle through the body of the article being tufted with one of said two heads of the tufting element connected to said needle so as to cause said head member to be positioned adjacent the face of the article being tufted, moving said needle through the center of an annular auxiliary member designed to fit around one of said heads, compressing said article, and releasing the tufting head connected to the needle when it has passed beyond the outer face of the article being tufted and auxiliary head member so that said two auxiliary head members will be caused to engage the opposite faces of the article being tufted by the expansion thereof.

3. A process for tufting, consisting of arranging tuftings comprising top and bottom elements joined with a band to the correct size for engaging through a mattress, cushion or the like, releasably engaging one of said elements with a tufting needle, attaching an auxiliary head member such as a button or the like to one of said tuftings adjacent one of said elements, passing said needle through the mattress, cushion or the like so that said head member is positioned adjacent one face of the mattress cushion or the like and the band extends completely through the mattress, cushion or the like, moving said needle through the center of an annular auxiliary head member designed to fit around one of said heads, releasing the element from the needle whereupon it is positioned in the center of said auxiliary head member and said member engages against the other face of the mattress, cushion or the like and the tufting is engaged in place.

4. As an article of manufacture, a fastening or tufting element, comprising an elongated body and fastening head positioned at one end thereof, and an ornamental button having a depression for receiving said head, said depression being of substantially the same depth as said button.

5. As an article of manufacture a fastening or tufting element, comprising an elongated body and an enlarged fastening head secured to and adapted to be positioned at one end thereof, and an ornamental button having an opening through which the head and body may be threaded and a depression for receiving said head.

6. As an article of manufacture a fastening or tufting element, comprising an elongated body and fastening head integrally formed at one end thereof, and an ornamental button having a shouldered depression for receiving said head.

7. As an article of manufacture a fastening or tufting element, comprising an elongated body and fastening head integrally formed at one end thereof, and an ornamental button having a depression for receiving said head, and an aperture in a wall of the depression for receiving said head when tilted from its normal position preparatory to its being positioned in said depression.

8. As an article of manufacture a fastening or tufting element, comprising an elongated body and fastening head integrally formed at one end thereof, an ornamental button having a depression in the exposed surface for receiving said head, and an aperture in a wall of the depression for receiving said head when tilted from its normal position preparatory to its being positioned in said depression.

9. As an article of manufacture a fastening or tufting element, comprising an elongated body and fastening head integrally formed at one end thereof, an ornamental button having a depression in the exposed surface for receiving said head, and an aperture in a wall of the depression for receiving said head preparatory to its being positioned in said depression, said depression being so shaped as to frictionally engage said head when so positioned in said depression.

10. As an article of manufacture, a fastening or tufting element, comprising an elongated body and a normally transverse relatively stiff fastening head attached to and positioned at one end of said body, said fastening head being adapted to be turned on end so as to be threaded through an article to be tufted or fastened, and relatively flat ornamental fastening element such as a button or the like adapted to receive said head, said element and head being of substantially the same thickness.

11. As an article of manufacture, a fastening or tufting element, comprising an elongated body and a normally transverse relatively stiff substantially rectangular fastening head attached to and operatively positioned at one end of said body, said fastening head being adapted to be turned on end so as to be threaded through an article to be tufted or fastened, and a round ornamental fastening element such as a button or the like adapted to receive said head, said element and head being of substantially the same thickness.

12. As an article of manufacture, a fastening or tufting element, comprising an elongated body and a normally transverse relatively stiff fastening head attached to and operatively positioned at one end of said body, said fastening head being adapted to be turned on end so as to be threaded through an article to be tufted or fastened, and an ornamental fastening element such as a button or the like adapted to receive said head said element and head being of substantially the same thickness, and an aperture formed as a part of said ornamental button of such size that said fastening head may be threaded through said aperture.

13. As an article of manufacture, a fastening or tufting element, comprising an elongated body and fastening head integrally formed at one end thereof, said fastening head being formed of fabric of a predetermined color, and an ornamental button having a depression for receiving said head whereby the fastening head becomes a part of the design of the button, the color of the button being matched and toned to the color of the fabric fastening head.

14. As an article of manufacture, a fastening or tufting element, comprising an elongated body and fastening head integrally formed at one end thereof, said fastening head being formed of fabric of a predetermined color, and an ornamental button having a depression for receiving said head whereby the fastening head becomes a part of the design of the button, the color of the button being matched and toned to the color of the fabric fastening head, said depression being so shaped as to frictionally hold said head in position in the button.

15. A tufting device comprising a tape or similar elongated body, a head having a depending portion containing a tape receiving opening, said head being tiltably mounted on said tape, in combination with an apertured member having a recessed portion, said apertured member and the recessed portions thereof defining portions, complemental to portions of said head, said head seated in said apertured member and the recess thereof.

16. A tufting device comprising a tape or similar elongated body, a head including a portion having an opening therein, said tape or body being mounted in said opening, in combination with an apertured member having wall portions defining a recess, the wall portions defining said recess being complemental to portions of said head and frictionally retaining said head in said apertured member.

ANNETTE FRIDOLPH.